(12) United States Patent
Nanzer et al.

(10) Patent No.: US 12,393,822 B2
(45) Date of Patent: Aug. 19, 2025

(54) HARMONIC RF TAG FOR WIRELESS MEASUREMENT OF MULTIPLE PRODUCTS

(71) Applicant: Board of Trustees of Michigan State University, East Lansing, MI (US)

(72) Inventors: Jeffrey Nanzer, Okemos, MI (US); Corwin Hilton, East Lansing, MI (US); Neda Nourshamsi, Fairfax, VA (US)

(73) Assignee: Board of Trustees of Michigan State University, East Lansing, MI (US)

( * ) Notice: Subject to any disclaimer, the term of this patent is extended or adjusted under 35 U.S.C. 154(b) by 128 days.

(21) Appl. No.: 18/289,971

(22) PCT Filed: May 4, 2022

(86) PCT No.: PCT/US2022/027566
§ 371 (c)(1),
(2) Date: Nov. 8, 2023

(87) PCT Pub. No.: WO2022/240622
PCT Pub. Date: Nov. 17, 2022

(65) Prior Publication Data
US 2024/0265230 A1     Aug. 8, 2024

Related U.S. Application Data

(60) Provisional application No. 63/188,035, filed on May 13, 2021.

(51) Int. Cl.
*G06K 19/07* (2006.01)
*G06K 19/067* (2006.01)
*G06K 19/077* (2006.01)

(52) U.S. Cl.
CPC ... *G06K 19/07786* (2013.01); *G06K 19/0672* (2013.01)

(58) Field of Classification Search
CPC ............ G06K 19/07786; G06K 19/0672
(Continued)

(56) References Cited

U.S. PATENT DOCUMENTS 4,068,232 A   1/1978  Meyers et al.
5,598,169 A   1/1997  Drabeck et al.
(Continued)

FOREIGN PATENT DOCUMENTS

CN       112366446 A       2/2021

OTHER PUBLICATIONS

International Search Report of the International Searching Authority, issued in PCT/US2022/027566, mailed Jul. 27, 2022; ISA/US.

*Primary Examiner* — Daniel A Hess
(74) *Attorney, Agent, or Firm* — Harness, Dickey & Pierce, PLC

(57) ABSTRACT

The harmonic tag includes a ring resonator circuit and may include a first ring microstrip disposed on a first side of a first dielectric substrate, a microstrip feedline spaced apart from and adjacent to the first ring microstrip and a ground plane disposed opposite the first ring microstrip and the microstrip feedline on a second side of the first dielectric substrate. The ring resonator circuit is tuned to resonate at an interrogation frequency. A dipole antenna circuit may include a dipole microstrip electrically coupled to the microstrip feedline through a first diode. The first diode causes the dipole microstrip to transmit a harmonic signal having a harmonic frequency twice the interrogation frequency.

20 Claims, 6 Drawing Sheets

(58) Field of Classification Search
USPC .......................................................... 235/492
See application file for complete search history.

(56) References Cited

U.S. PATENT DOCUMENTS

| | | | |
|---|---|---|---|
| 6,456,228 B1 | 9/2002 | Granhed et al. | |
| 6,859,174 B2* | 2/2005 | Kane | H01Q 19/005 |
| | | | 343/846 |
| 2005/0253767 A1 | 11/2005 | Liu et al. | |
| 2009/0079658 A1* | 3/2009 | Surducan | H01Q 9/28 |
| | | | 343/893 |
| 2016/0149306 A1* | 5/2016 | Hung | A61B 5/0507 |
| | | | 600/430 |
| 2020/0076082 A1 | 3/2020 | Nasimuddin et al. | |
| 2020/0334425 A1 | 10/2020 | Gangopadhyay et al. | |
| 2021/0019484 A1* | 1/2021 | Ladan | G06K 19/07758 |

\* cited by examiner

HARMONIC RF TAG FOR WIRELESS MEASUREMENT OF MULTIPLE PRODUCTS

CROSS-REFERENCE TO RELATED APPLICATIONS

This application is a 371 U.S. National Phase of International Application No. PCT/US2022/027566, filed on May 4, 2022, and also claims the benefit of U.S. Provisional Application No. 63/188,035, filed on May 13, 2021. The entire disclosures of the above applications are incorporated herein by reference.

FIELD

The present disclosure relates generally to tracking devices that attach to an object for tracking the movement of the object, and, more specifically, to an antenna for a tracking device.

BACKGROUND

This section provides background information related to the present disclosure which is not necessarily prior art.

There has been increasing interest in the ability to remotely detect and measure the motions of held objects in living spaces for applications such as human computer interaction and connected homes. Furthermore, home health and remote diagnostic applications have seen dramatically increased demand in the past year as people look for solutions to health care that do not require leaving the home. While optical systems can track the motions of people and objects, privacy concerns related to devices obtaining images in the home have been a concern.

SUMMARY

This section provides a general summary of the disclosure and is not a comprehensive disclosure of its full scope or all of its features.

Harmonic Doppler radar presents a solution that not only mitigates such privacy concerns, but also requires less data processing, and can easily differentiate between human motions and the motions of tagged objects. Passive harmonic tags can furthermore be made cheaply, enabling the detection and tracking of low-cost objects that otherwise would not include electronics. A challenge involved in harmonic Doppler measurements is the ability to discriminate tags in the environment.

In one aspect of the disclosure, a narrowband harmonic tag has a microstrip antenna based on a ring resonator design that is capacitively coupled to the signal feed. By tuning the ring radius and coupling capacitance, the operational bandwidth of the tag can be minimized, enabling better discrimination of separate tags. Multiple tags may be used in an area. Tuning allows identification of all tags in the region. Each tag captures an interrogation frequency signal around the 2.5 GHz band (in this example) with a ring microstrip antenna (tuned differently for each tag) and uses a diode to generate a harmonic signal at about 5 GHz that is retransmitted back to the interrogator using a dipole antenna.

In another aspect of the disclosure, the harmonic tag also includes a ring resonator circuit that includes a first ring microstrip disposed on a first side (layer) of a first dielectric substrate, a microstrip feedline spaced apart from and adjacent to the first ring microstrip and a ground plane disposed opposite the first ring microstrip and the microstrip feedline on a second side (layer) of the first dielectric substrate. The ring resonator circuit tuned to resonate at an interrogation frequency. A dipole antenna circuit may include a dipole microstrip electrically coupled to the microstrip feedline through a first diode, said first diode causing the dipole microstrip to transmit a harmonic signal having a harmonic frequency twice the interrogation frequency.

Implementations may include one or more of the following features. The harmonic tag where the dipole microstrip is disposed on the first side of the first dielectric substrate. The dipole antenna circuit is disposed on a second dielectric substrate spaced apart from the first dielectric substrate. The microstrip feedline is coupled to the dipole microstrip of the dipole antenna circuit with a coaxial connector. The first ring microstrip may include a first inner diameter and may include a second ring microstrip concentric with the first ring microstrip. The second ring microstrip may include an outer diameter less than the first inner diameter. The microstrip feedline is rectangular. The dipole microstrip is L-shaped on the first side layer with a mirrored L-shape on the second side layer. The ring resonator circuit is tuned based on at least one of a diameter of the first ring microstrip, a response frequency of the first diode and a gap between the microstrip feedline and the first ring microstrip.

One general aspect includes the harmonic tag also including a ring resonator circuit may include a first ring microstrip disposed on a first side of a dielectric substrate, said first ring microstrip may include a first diameter, said ring resonator circuit may include a microstrip feedline spaced apart from the first ring microstrip by a gap. The gap and the diameter tuned to receive an interrogation frequency. A dipole antenna circuit may include a dipole microstrip disposed on the first side and electrically coupled to the microstrip feedline through a first diode. The first diode causes the dipole microstrip to radiate a harmonic signal having a harmonic frequency about twice the interrogation frequency. The tag also includes the microstrip feed, the first ring microstrip, said first diode and the dipole microstrip disposed opposite a ground plane disposed on a second side of the dielectric substrate.

Implementations may include one or more of the following features. The harmonic tag where the first ring microstrip may include a first inner diameter and may include a second ring microstrip concentric with the first ring microstrip, said second ring microstrip may include an outer diameter less than the first inner diameter. The microstrip feedline is rectangular. The dipole microstrip is L-shaped on the top layer with a mirrored L-shape on the second side. The ring resonator circuit is tuned based on a response frequency of the first diode.

One general aspect includes a system having an interrogator having an interrogation frequency. The system also includes a first ring resonator circuit may include a first ring microstrip disposed on a first side of a first dielectric substrate, a first microstrip feedline spaced apart from and adjacent to the first ring microstrip and a first ground plane disposed opposite the first ring microstrip and the first microstrip feedline on a second side of the first dielectric substrate. The first ring resonator circuit is tuned to resonate at an interrogation frequency. A first dipole antenna circuit may include a first dipole microstrip electrically coupled to the first microstrip feedline through a first diode. The first diode causes the first dipole microstrip to transmit a first harmonic signal having a first harmonic frequency about twice the interrogation frequency. The system also includes a second ring resonator circuit may include a second ring microstrip disposed on a first side of a second dielectric substrate, a second microstrip feedline spaced apart from and adjacent to the second ring microstrip and a second ground plane disposed opposite the second ring microstrip and the second microstrip feedline on a second side of the second dielectric substrate. The second ring resonator circuit is tuned to resonate at the interrogation frequency. A second dipole antenna circuit may include a second dipole microstrip electrically coupled to the second microstrip feedline through a second diode. The second diode causes the second dipole microstrip to transmit a second harmonic signal having a second harmonic frequency about twice the interrogation frequency and different than the first harmonic frequency.

Implementations may include one or more of the following features. The system may include the interrogator, said interrogator may include a transmitter circuit and a receiver circuit, said transmitter circuit transmitting the interrogation frequency. The first dipole microstrip is disposed on the first side of the first substrate and the second dipole microstrip is disposed on a first side of the second dielectric substrate. The first dipole antenna circuit is disposed on a third dielectric substrate spaced apart from and electrically coupled to the first dielectric substrate, and the second dipole antenna circuit is disposed on a fourth dielectric substrate spaced apart from and electrically coupled to the second dielectric substrate. The first ring microstrip may include a first inner diameter and may include a third ring microstrip concentric with the first ring microstrip. The third ring microstrip may include an first outer diameter less than the first inner diameter and where the second ring microstrip may include a second inner diameter and may include a fourth ring microstrip concentric with the second ring microstrip. The fourth ring microstrip may include a second outer diameter less than the second inner diameter. The first ring resonator circuit is tuned based on at least one of a diameter of the first ring microstrip, a first response frequency of the first diode and a first gap between the first microstrip feedline and the first ring microstrip The second ring resonator circuit is tuned based on at least one of a diameter of the second ring microstrip, a second response frequency of the second diode and a second gap between the second microstrip feedline and the second ring microstrip.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
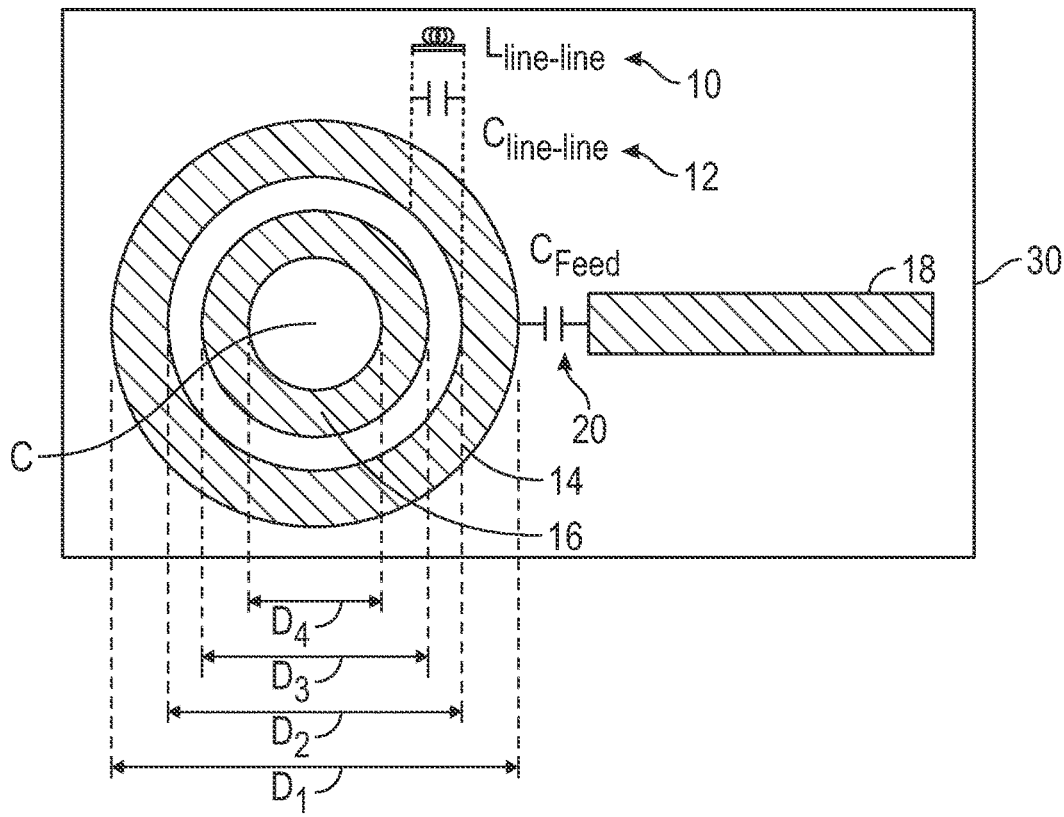
FIG. 1A is a top view of a substrate having a first example of ring resonator circuit of a harmonic tag.

Referring now to FIG. 1A, a first example of a portion of a harmonic tag 10 is set forth. The portion of the harmonic tag 10 illustrated is a ring resonator circuit 12. The ring resonator circuit 12 in FIG. 1A includes a first ring microstrip 14 that has an outer diameter D1 and an inner diameter D2. A second ring microstrip 16 is concentric to the first ring microstrip 14. The second ring microstrip 16 has an outer diameter D3 and an inner diameter D4. The ring microstrips 14, 16 have a center C.

The ring resonator circuit 12 also includes a microstrip feedline 18. The microstrip feedline 18 is elongated and rectangular in shape and is spaced apart from the first ring microstrip 14 by a gap 20. The gap 20 together with the diameter of the first ring microstrip 14 and the second ring microstrip 16 control the resonant frequency and thus the receiving frequency of the ring resonators circuit 12. The receiving frequency may be adjusted to match the interrogation frequency used by the interrogator described below. A capacitance $C_{Feed}$ is illustrated between the first ring microstrip 14 and the microstrip feedline 18. There is also capacitance between the first ring microstrip 14 and the second ring microstrip 16 illustrated as $C_{line-line}$. Also, between the first ring microstrip 14 and the second ring microstrip 16 is an inductance $L_{line-line}$.

The ring resonator circuit 12 is disposed on a dielectric substrate 30. The substrate 30 has a first side 30A with the first ring microstrip 14, the second ring microstrip 16 and the microstrip feedline 18. A bottom layer or second side 30B, not illustrated in FIG. 1A, has a ground plane 32. The ground plane 32 is disposed opposite the first ring microstrip 14, the second ring microstrip 16 and the microstrip feedline 18. Further, the ground plane 32 may extend as a rectangle greater than the area of the first ring microstrip 14, the second ring microstrip 16 and the microstrip feedline 18. A system may use many two ring microstrips. If two tags are in a system four rings are used.

Figure 1B:
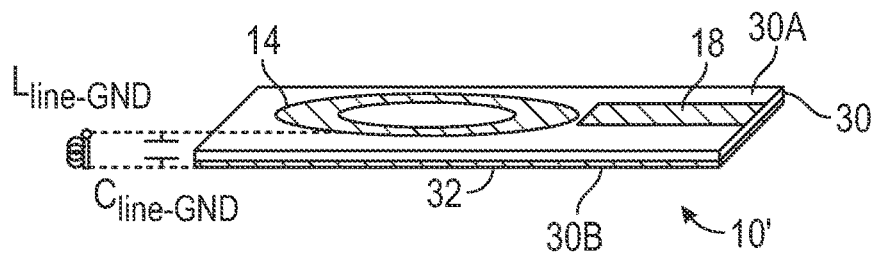
FIG. 1B is a perspective view of a substrate having a second example of a ring resonator circuit of a harmonic tag.

Referring now to FIG. 1B, a second example of a harmonic tag 10' is set forth. The harmonic tag 10', in this example, has only the first ring microstrip 14 which is disposed adjacent to the microstrip feedline 18. In this example, the ground plane 32 is illustrated. The capacitance between the first ring microstrip 14 and the ground plane 32 is denoted by $C_{line-Gnd}$. The inductance between the first ring microstrip 14 and the ground plane 32 is denoted by $L_{line-Gnd}$.

It should be noted that in FIGS. 1A and 1B, one or two microstrip rings are illustrated, respectively. However, one, two or more microstrip rings may be incorporated into a harmonic tag 10 depending on the desired resonance frequency and bandwidth.

As will be described in more detail below, the tag 10 may be part of a system with an interrogation system with an interrogator (transmitter and receiver or transceiver) used for exciting/interrogating a number of tags in a specific area with the interrogation frequency. The tags may be tuned to respond with different harmonic frequencies for identification purposes. The product being moved and the type of product associated with each tag may be identified. The narrowband operation can be characterized in terms of the antenna quality factor $$Q = \frac{fc}{\Delta f} \quad (1)$$

where $f_c$ is the antenna resonance frequency and $\Delta f$ is the half-power bandwidth at the resonance frequency. Generally, the antenna Q is dependent on the impedances of the antenna that define its resonance frequency. The bandwidth and thus antenna Q can be tuned by changing the resonance characteristics of the antenna by tuning the relevant impedances. The microstrip ring resonator circuit 12 is used because it is simple to manufacture and yields relatively high Q without active components or different materials.

Figure 1C:
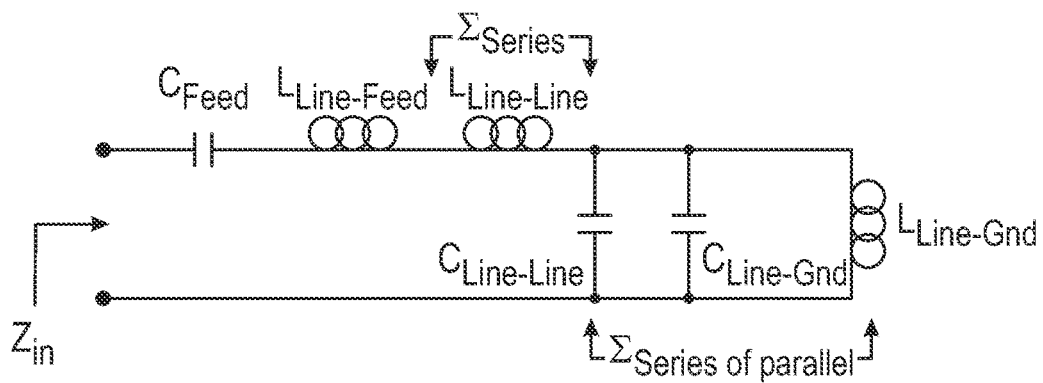
FIG. 1C is an equivalent circuit of the ring resonator circuit of FIG. 1A.

Referring now to FIG. 1C, an antenna model of the ring resonator circuit 12 of FIG. 1B are shown. The antenna model has the feed capacitance $C_{Feed}$ in series with the line impedance $L_{Line-Feed}$. A line-to-line inductance $L_{Line-Line}$. A parallel combination of the line-to-line capacitance $C_{Line-Line}$ in parallel with a line to ground capacitance $C_{Line-Gnd}$ which is in parallel with a line to ground inductance $L_{Line-Gnd}$. Thus, there is a series combination and a parallel combination of the various capacitances and inductances. If another ring is added to the system, another line-to-line inductance and another line to feed inductance is incorporated therein. As well, an additional line to line capacitance and a line to ground capacitance for the additional ring may be provided as well as an additional line to ground inductance.

Figure 2A:
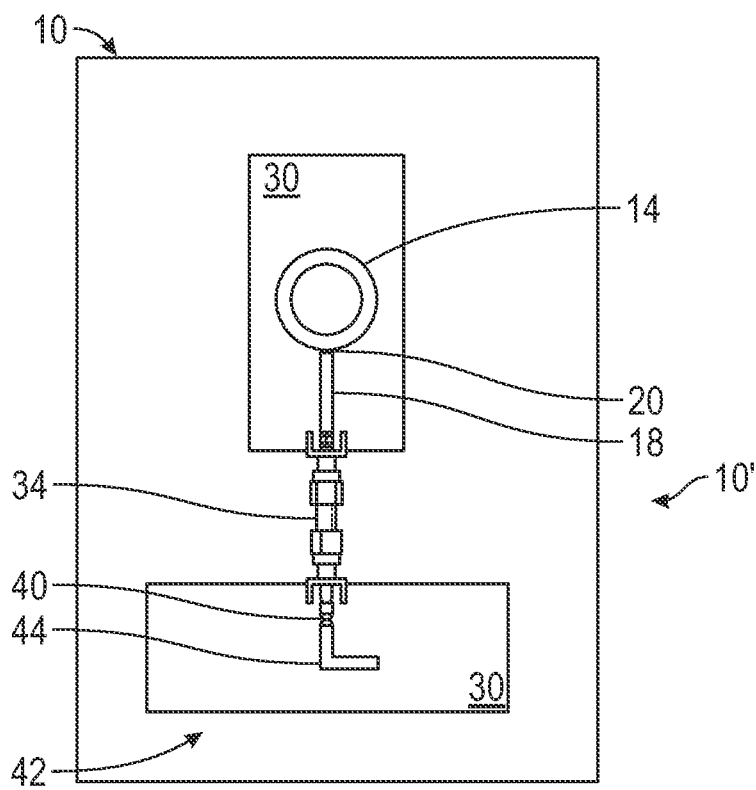
FIG. 2A is a top view of a harmonic tag having two different substrates having a respective ring resonator circuit and dipole antenna circuit.
Figure 2B:
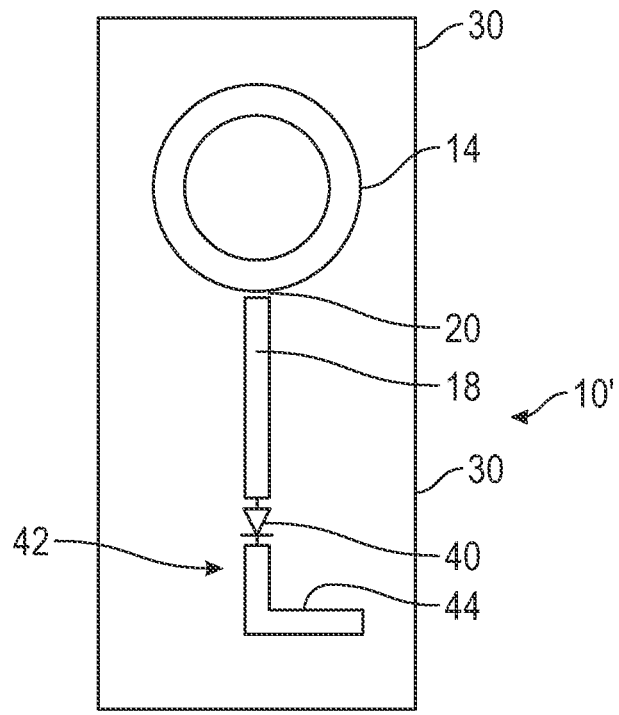
FIG. 2B is a top view of a ring resonator circuit and dipole antenna circuit on the same substrate.

Referring now to FIGS. 2A and 2B, examples of the tag 10' is illustrated on two dielectric substrates 30' in FIG. 2A and one dielectric substrate 30 in FIG. 2B. In FIG. 2A a connector 34 is illustrated, where in FIG. 2B no connector is required. The connector 34 of FIG. 2A may be a coaxial connector. The tag 10' in this example is a 2.5 GHz single ring antenna with a capacitive coupling to the microstrip feedline 18. The 2.5 GHz signal from ring resonator circuit 12 is electrically coupled to a diode 40 to generate harmonics, with the first harmonic at 5 GHz retransmitted via a microstrip dipole antenna circuit 42 having a dipole microstrip 44 that is electrically coupled to the microstrip feedline 18 through the diode 40. The diode 40 may be a Schottky diode having a response frequency to generate about the second harmonic of the incident 2.5 GHZ. The diode 40 from tag to tag may vary in response frequency so that each tag communicates a unique identifier for tracking purposes. In this example, the dipole microstrip 44 is L-shaped on the top layer with a corresponding mirrored L-shape on a bottom layer or second side 30B.

The ring radius and the capacitive coupling gap between the feedline and the ring antenna are tuned to achieve a measured bandwidth of the ring resonator circuit 12. The equivalent circuit model closely resembles that of an LC filtering circuit. The major impedances are the feedline capacitance, the inductance and capacitance between the ring and the ground, and, if multiple concentric rings are used, the line-to-line impedances.

An antenna based on a single or multiple concentric rings may be provided. The principal impedance parameters are the feedline capacitance and the line-to-ground impedances which are dependent on the width of the microstrip line and the radius/diameters of the ring(s). The ring antenna was designed and simulated in HFSS. The simulated bandwidth of the antenna at the −10 dB S11 points was 17.6 MHz, yielding a fractional bandwidth of 0.7% and a Q of 143 with a simulated gain of 5.1 dBi.

The harmonic tag 10, in this example, has the 2.5 GHz ring resonator antenna, a Schottky diode used to generate the second harmonic of the incident 2.5 GHz signal, and a 5 GHz half wavelength dipole used to retransmit the second harmonic. FIG. 2A shows the manufactured 2.5 GHz ring antenna connected to the 5 GHz dipole antenna with separated circuit boards as shown in FIG. 2A. However, the ring resonator circuit 12 portion, the 5 GHz dipole antenna circuit 42 and the Schottky diode therebetween are located on the same substrate 30 as in FIG. 2B. The diode 40 is integrated onto the dipole feedline to the dipole and is located just beyond the SMA connector. The diodes in different tags may be change changed to provide different response frequencies. That is, different tags may be used to uniquely identify different tags in products by changing the response frequencies. In a practical example, the SMA connector may be eliminated when the antenna portions are disposed on the same circuit board.

Figure 3A:
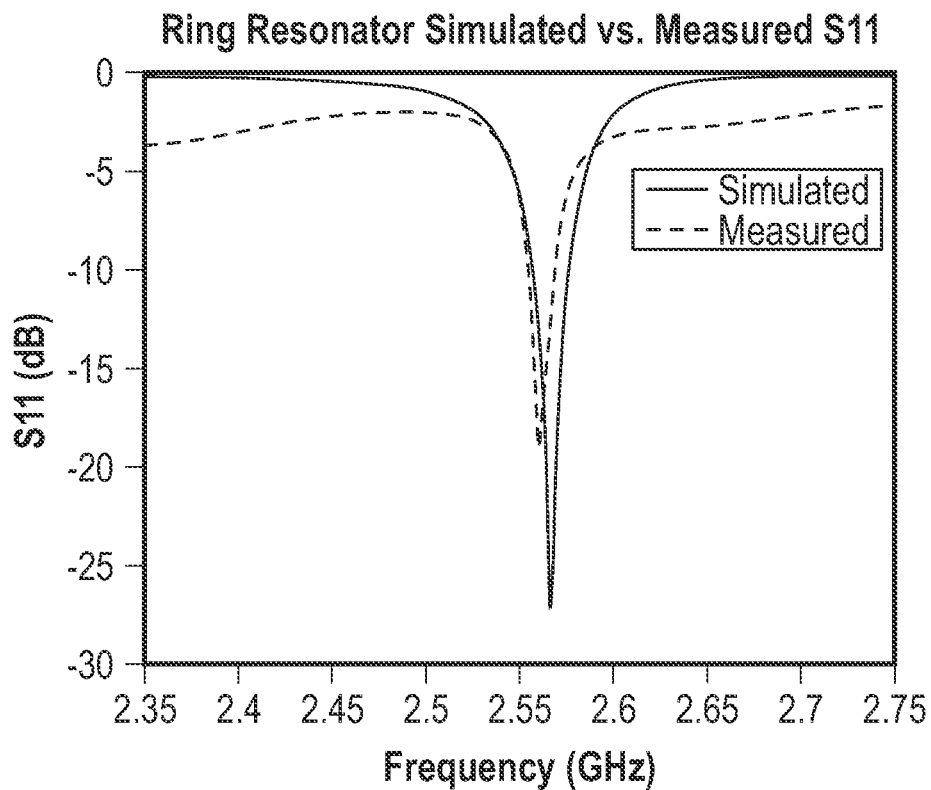
FIG. 3A is a plot of S11 (reflective power) versus frequency for the simulated harmonic tag and a measured harmonic tag.
Figure 3B:
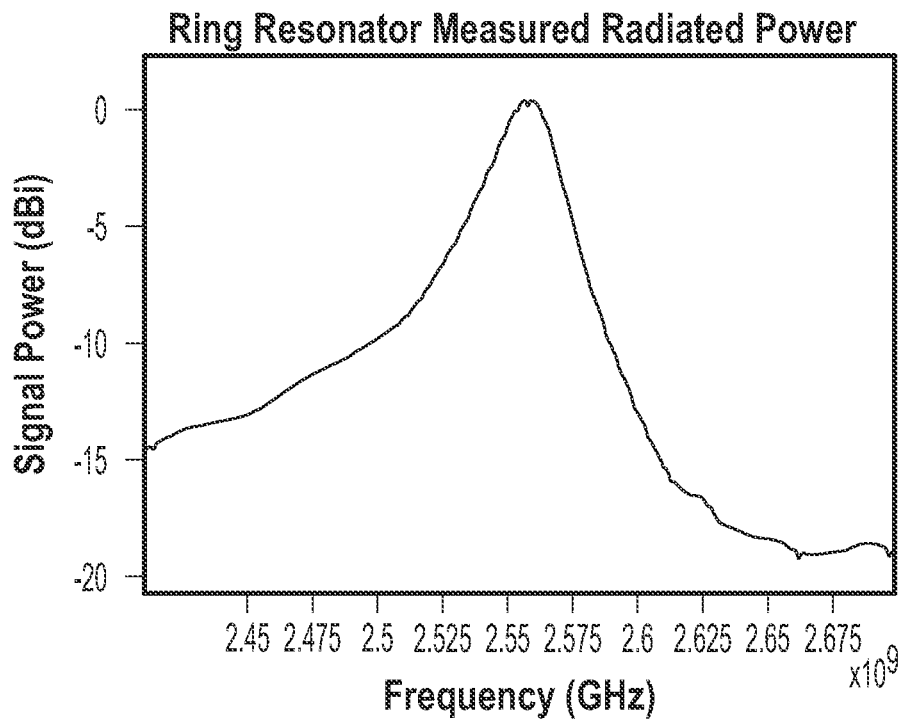
FIG. 3B is a plot of measured radiated power for a ring resonator versus frequency.

Referring now to FIG. 3A, the simulated and measured S11 (reflected power) of the 2.5 GHZ antenna show good agreement. The measured normalized radiated power (normalized gain) is shown in FIG. 3B indicating a half-power bandwidth of approximately 24 MHz for a fractional bandwidth of 0.9% for a Q of 111.

Figure 4:
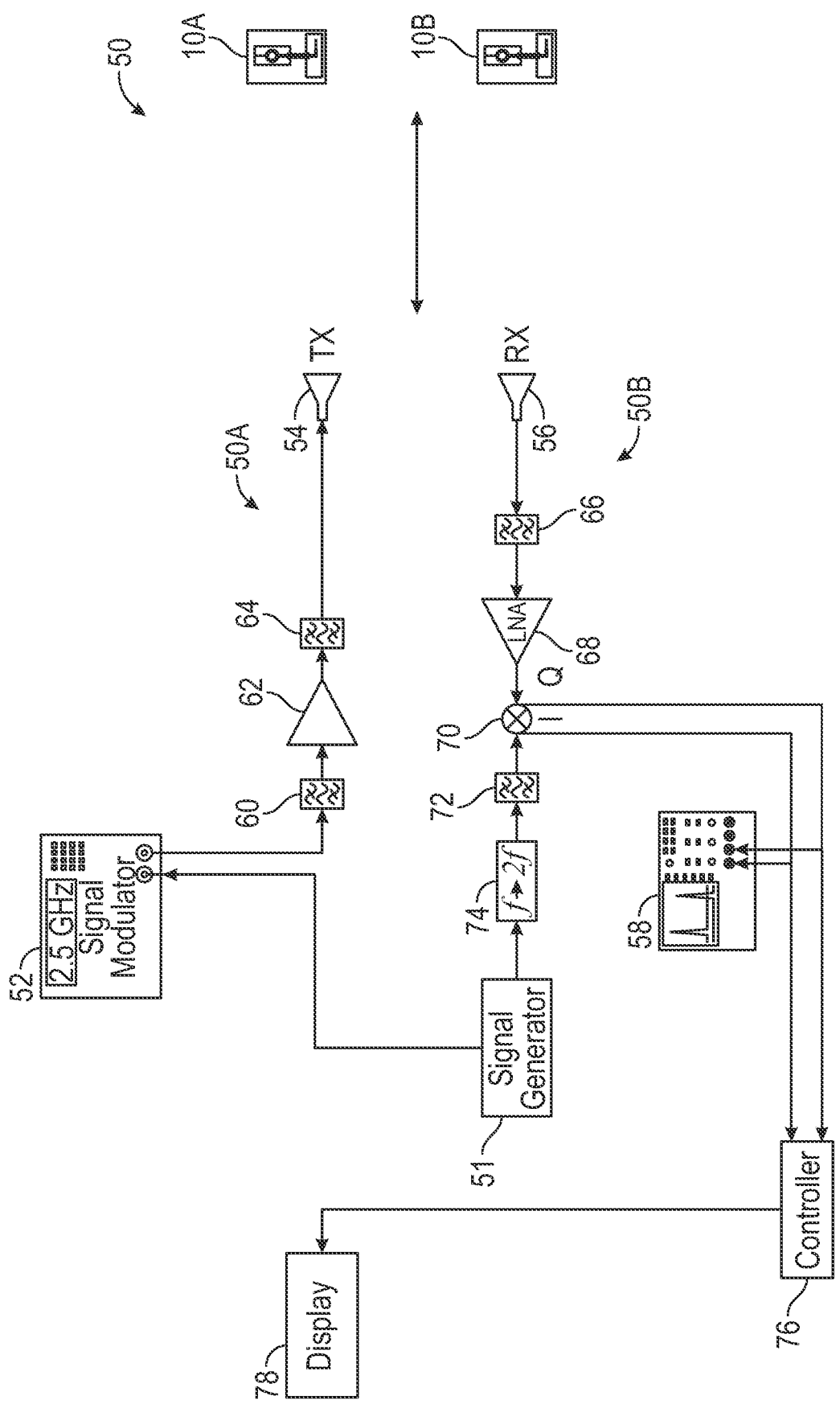
FIG. 4 is a schematic view of an interrogator circuit.

Referring now to FIG. 4, an interrogator circuit 50 with a transmitter circuit (TX) 50A and a receiver circuit (RX) 50B is used to excite the ring resonator circuit 12 of the tags 10A and 10B using the 2.4 GHz frequency. A response is generated at the dipole antenna circuit 42 of the tags 10A and 10B. Although both tags 10A, 10B are excited by the same frequency band (in this example around 2.5 GHZ) the responses generated are harmonics (in this example around 5 GHZ). However, both are unique. In a system with multiple tags, all the response frequencies may be unique. Some tags may also have the same frequency and additional discrimination capabilities such as the case of a product identifier. The tuning differences in the tags 10A and 10B are discussed above.

The receiver circuit 50B receives the frequency generated by the dipole antenna circuits 42 of each tag 10A, 10B. The measurements of the full tag in FIGS. 2A and 2B were conducted by transmitting a 2.5 GHZ signal using a signal generator 52 and a standard-gain horn antenna 54. The retransmitted 5 GHz harmonic signal was received at a receiving feed horn 56 using a high-speed oscilloscope 58 and a standard-gain horn antenna.

Appropriate filtering and amplification may be performed. In the transmit circuit 50A, a first signal generator 51 generates a signal at the fundamental frequency (in this example around 2.5 GHZ). The signal from the generator 51 may be modified by a signal modulator 52. A first bandpass filter 60 receives the signal to be amplified by the amplifier 62. That is, the 2.5 GHZ signal generated by the signal generator 51 and modified by the signal modulator 52 is bandpass filtered at the bandpass filter 60 then amplified in the amplifier 62. The signal generator 51 may be replaced by an oscillator in a commercial embodiment. The signal modulator 52 may be removed in a commercial embodiment. A second bandpass filter 64 ultimately filters and communicates the amplified and filtered signal to the transmit feed horn 54. The harmonic tags 10A, 10B may each have a ring antenna 14 that, combined with diode 40, is tuned to provide different response frequencies that are about or around the harmonic of 5 GHz. The receive feed horn 56 inputs the signal to the bandpass filter 66. A low noise amplifier 68 amplifies the signal. The fundamental frequency generated by the signal generator 51 is input to a frequency multiplier 74. The output of the frequency multiplier is filtered with bandpass filter 72. A mixer 70 accepts the received signal from the low noise amplifier 68 and the bandpass filter 72 and converts the received signal to a low frequency signal to be monitored by an oscilloscope 58 or a controller 76. The oscilloscope 58 may be removed in a commercial embodiment. The controller 76 may control a commercial function such as identifying the tag, determining the quantity of tags and/or determining the position of a tag within an environment proximate the transmitter circuit 50A. A display 78 coupled to the controller 76 may display various functions including the identifier and the position of the product with the tags 10A, 10B thereon. The tags 10A, 10B may also be used to identify various types of people, locations, products or other items. The display 78 may receive identifier signals from the controller 76 for display to an operator thereon.

Figure 5:
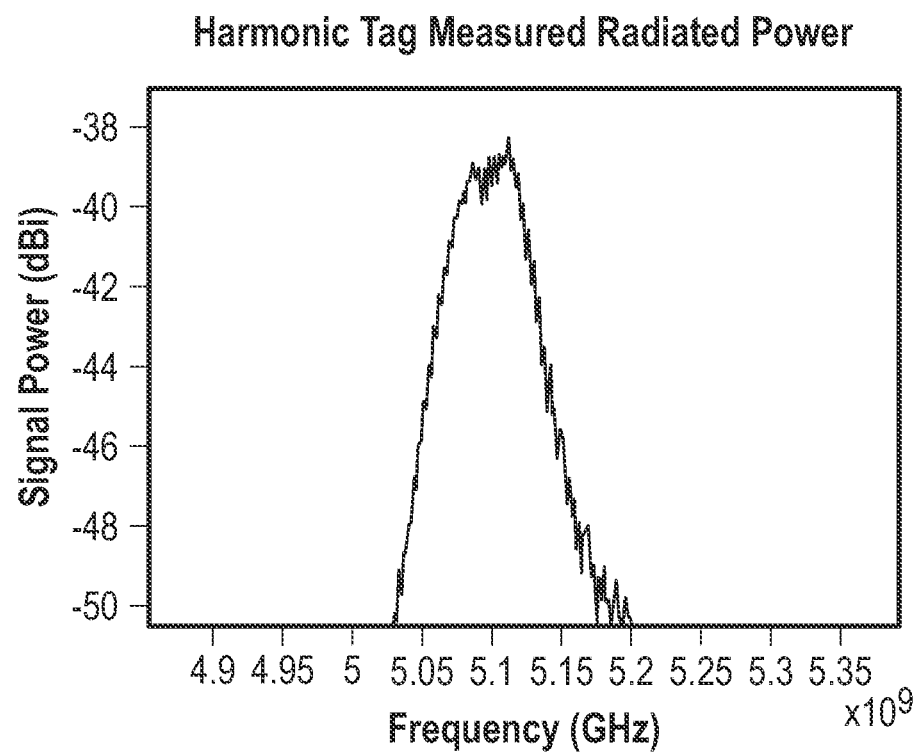
FIG. 5 is a plot of signal power versus measured radiated power of a harmonic tag at the 5 GHz second harmonic frequency.

Referring now to FIG. 5, the normalized received power at the 5 GHz second harmonic is shown. The fractional bandwidth at the second harmonic was 1.3%.

Figure 6A:
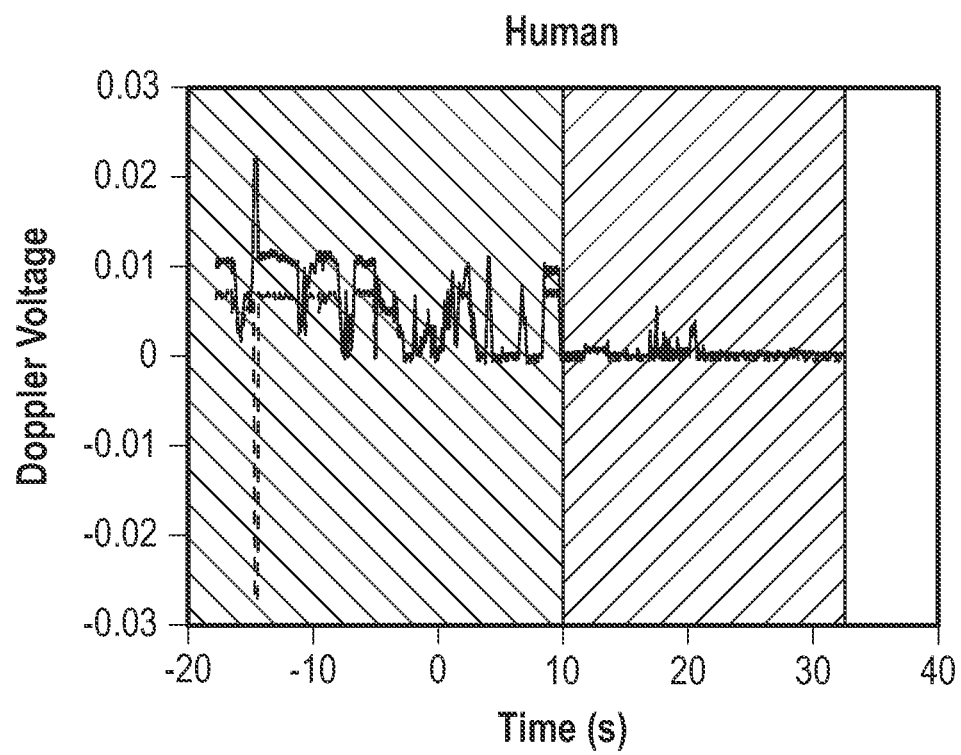
FIG. 6A is a plot of the doppler voltage versus time for two different tag bands.
Figure 6B:
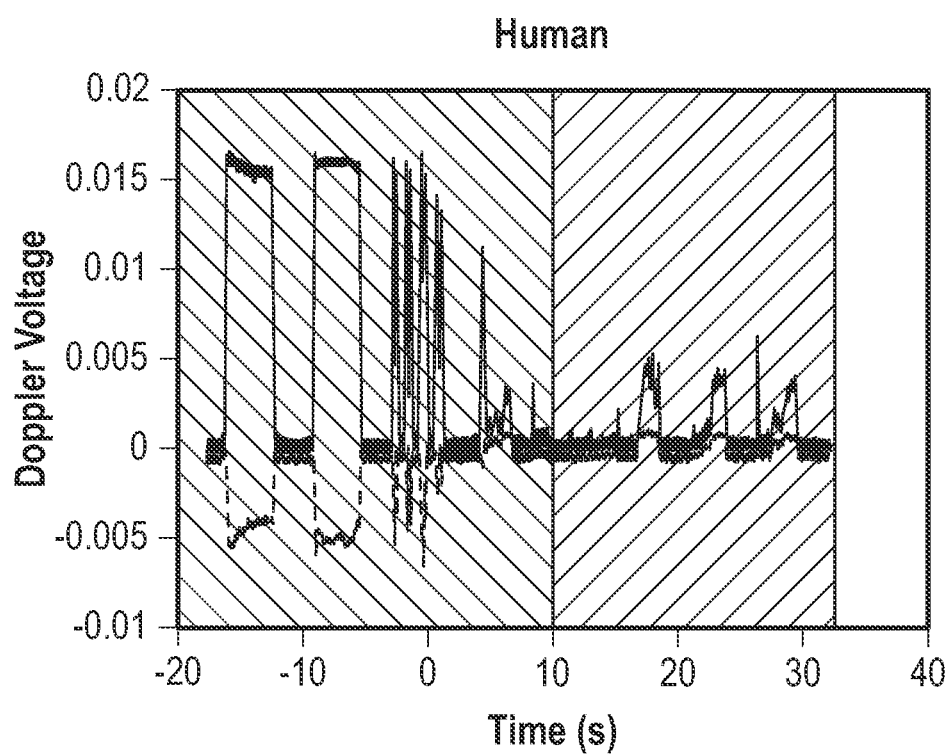
FIG. 6B is the doppler voltage versus time of two different times.
Figure 6C:
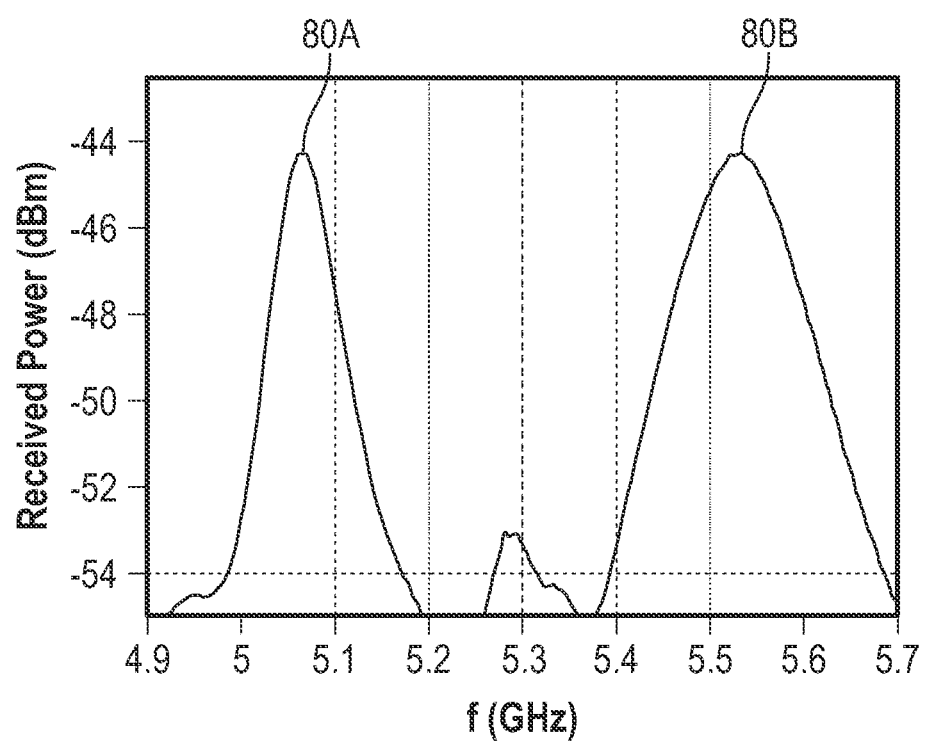
FIG. 6C is a plot of the received power from two different tags at about the 5 GHz frequency.

In FIGS. 6A, 6B and 6C, the two tags 10 of FIG. 4 may be used as part of a system that has multiples tags on multiple products. Two tags were designed with only one ring having a fundamental frequency (2.5 GHZ) and dipole at about the harmonic frequency. Tags are designed at different frequencies via different ring radii. A radar transmitting a single tone at center frequency is used and the measurements of FIGS. 6A and 6B show selectivity via bandwidth separation.

FIG. 6C shows another measurement example with two tags such as tags 10A, 10B (although many tags greater than two may be used.) The tags 10A, 10B were measured at ½ meter distance with a broadband sweep on transmit. The two tags were measured sequentially. Resonance at desired frequencies with ~10 dB more received power was very consistent between tags. The bandwidth slightly increased unexpectedly from dipole/ring tag design. In FIG. 6C, two distinct peaks 80A and 80B are illustrated separated by various signals. Peak 80A is between 5 and 5.1 GHZ, while peak 80B is between 5.5 and 5.6 GHz. The peaks 80A, 80B may be used to identify two different products or tags. If more tags are used each may have a different peak frequency. The frequencies are both about 5 GHZ (the harmonic), but the peaks are tuned at slightly different frequencies.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A harmonic tag comprising:
a ring resonator circuit comprising a first continuous ring microstrip disposed on a first side of a first dielectric substrate, a microstrip feedline spaced apart from the first continuous ring microstrip by a gap and said microstrip feedline adjacent to the first continuous ring microstrip, and a ground plane disposed opposite the first continuous ring microstrip and the microstrip feedline on a second side of the first dielectric substrate, said ring resonator circuit tuned to resonate at an interrogation frequency determined by the gap between the microstrip feedline and the first continuous ring microstrip; and
a dipole antenna circuit comprising a dipole microstrip electrically coupled to the microstrip feedline through a first diode, said first diode causing the dipole microstrip to transmit a harmonic signal having a harmonic frequency twice the interrogation frequency.

2. The harmonic tag of claim 1 wherein the dipole microstrip is disposed on the first side of the first dielectric substrate.

3. The harmonic tag of claim 1 wherein the dipole antenna circuit is disposed on a second dielectric substrate spaced apart from the first dielectric substrate.

4. The harmonic tag of claim 3 wherein the microstrip feedline is coupled to the dipole microstrip of the dipole antenna circuit with a coaxial connector.

5. The harmonic tag of claim 1 wherein the first continuous ring microstrip comprises a first inner diameter and further comprising a second ring microstrip concentric with the first continuous ring microstrip, said second ring microstrip comprising an outer diameter less than the first inner diameter.

6. The harmonic tag of claim 1 wherein the microstrip feedline is rectangular.

7. The harmonic tag of claim 1 wherein the dipole microstrip is L-shaped on the first side with a mirrored L-shape on the second side.

8. The harmonic tag of claim 1 wherein the ring resonator circuit is tuned based on at least one of a diameter of the first continuous ring microstrip, a response frequency of the first diode and the gap between the microstrip feedline and the first continuous ring microstrip.

9. A harmonic tag comprising:
a ring resonator circuit comprising a first continuous ring microstrip disposed on a first side of a dielectric substrate, said first continuous ring microstrip comprising a first diameter, said ring resonator circuit comprising a microstrip feedline spaced apart from the first continuous ring microstrip by a gap, said gap and said diameter tuned to receive an interrogation frequency; and
a dipole antenna circuit comprising a dipole microstrip disposed on the first side and electrically coupled to the microstrip feedline through a first diode, said first diode causing the dipole microstrip to radiate a harmonic signal having a harmonic frequency about twice the interrogation frequency;

said microstrip feed, the first continuous ring microstrip, said first diode and the dipole microstrip disposed opposite a ground plane disposed on a second side of the dielectric substrate.

10. The harmonic tag of claim 9 wherein the first continuous ring microstrip comprises a first inner diameter and further comprising a second ring microstrip concentric with the first continuous ring microstrip, said second ring microstrip comprising an outer diameter less than the first inner diameter.

11. The harmonic tag of claim 10 wherein the microstrip feedline is rectangular.

12. The harmonic tag of claim 10 wherein the dipole microstrip is L-shaped on the first side with a mirrored L-shape on the second side.

13. The harmonic tag of claim 10 wherein the ring resonator circuit is tuned based on a response frequency of the first diode.

14. A system having an interrogator having an interrogation frequency comprising:
a first ring resonator circuit comprising a first continuous ring microstrip disposed on a first side of a first dielectric substrate, a first microstrip feedline spaced apart from and adjacent to the first continuous ring microstrip and a first ground plane disposed opposite the first continuous ring microstrip and the first microstrip feedline on a second side of the first dielectric substrate, said first ring resonator circuit tuned to resonate at an interrogation frequency;
a first dipole antenna circuit comprising a first dipole microstrip electrically coupled to the first microstrip feedline through a first diode, said first diode causing the first dipole microstrip to transmit a first harmonic signal having a first harmonic frequency about twice the interrogation frequency;
a second ring resonator circuit comprising a second continuous ring microstrip disposed on a first side of a second dielectric substrate, a second microstrip feedline spaced apart from and adjacent to the second continuous ring microstrip and a second ground plane disposed opposite the second continuous ring microstrip and the second microstrip feedline on a second side of the second dielectric substrate, said second ring resonator circuit tuned to resonate at the interrogation frequency; and
a second dipole antenna circuit comprising a second dipole microstrip electrically coupled to the second microstrip feedline through a second diode, said second diode causing the second dipole microstrip to transmit a second harmonic signal having a second harmonic frequency about twice the interrogation frequency and different than the first harmonic frequency.

15. The system of claim 14 further comprising the interrogator, said interrogator comprising a transmitter circuit and a receiver circuit, said transmitter circuit transmitting the interrogation frequency.

16. The system of claim 14 wherein the first dipole microstrip is disposed on the first side of the first dielectric substrate and the second dipole microstrip is disposed on a first side of the second dielectric substrate.

17. The system of claim 14 wherein the first dipole antenna circuit is disposed on a third dielectric substrate spaced apart from and electrically coupled to the first dielectric substrate, and the second dipole antenna circuit is disposed on a fourth dielectric substrate spaced apart from and electrically coupled to the second dielectric substrate.

18. The system of claim 17 wherein the first microstrip feedline is coupled to the first dipole microstrip of the first dipole antenna circuit with a first coaxial connector and wherein the second microstrip feedline is coupled to the second dipole microstrip of the second dipole antenna circuit with a second coaxial connector.

19. The system of claim 17 wherein the first continuous ring microstrip comprises a first inner diameter and further comprising a third continuous ring microstrip concentric with the first continuous ring microstrip, said third continuous ring microstrip comprising an first outer diameter less than the first inner diameter and wherein the second continuous ring microstrip comprises a second inner diameter and further comprising a fourth continuous ring microstrip concentric with the second continuous ring microstrip, said fourth continuous ring microstrip comprising a second outer diameter less than the second inner diameter.

20. The system of claim 19 wherein the first ring resonator circuit is tuned based on at least one of a diameter of the first continuous ring microstrip, a first response frequency of the first diode and a first gap between the first microstrip feedline and the first continuous ring microstrip and wherein the second ring resonator circuit is tuned based on at least one of a diameter of the second continuous ring microstrip, a second response frequency of the second diode and a second gap between the second microstrip feedline and the second ring microstrip.

* * * * *